United States Patent
Alattar et al.

(10) Patent No.: US 11,875,218 B1
(45) Date of Patent: Jan. 16, 2024

(54) 2D CODE READING IN PRESENCE OF LOCAL INVERSION

(71) Applicant: Digimarc Corporation, Beavertion, OR (US)

(72) Inventors: Adnan M. Alattar, Tigard, OR (US); Vojtech Holub, Portland, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

(21) Appl. No.: 17/687,247

(22) Filed: Mar. 4, 2022

Related U.S. Application Data (60) Provisional application No. 63/156,866, filed on Mar. 4, 2021.

(51) Int. Cl.
- *G06K 7/10* (2006.01)
- *G06K 19/06* (2006.01)
- *G06K 7/14* (2006.01)

(52) U.S. Cl.
CPC ..... *G06K 7/10861* (2013.01); *G06K 7/10851* (2013.01); *G06K 7/1447* (2013.01); *G06K 19/06131* (2013.01)

(58) Field of Classification Search
CPC ............. B07C 5/3412; B07C 5/342; B07C 2501/0045; B07C 5/3422; B42D 25/324; B42D 25/333; G06T 2207/30108; G06T 7/0004; H04N 23/56; H04N 23/74; H05B 45/10; H05B 45/14; H05B 45/395; H05K 7/2039
See application file for complete search history.

(56) References Cited

U.S. PATENT DOCUMENTS

| | | | |
|---|---|---|---|
| 5,420,410 A | 5/1995 | Bremer |
| 5,811,777 A | 9/1998 | Ackley |
| 6,614,914 B1 | 9/2003 | Rhoads |
| 6,718,046 B2 | 4/2004 | Reed |
| 6,768,809 B2 | 7/2004 | Rhoads |
| 6,891,959 B2 | 5/2005 | Reed |
| 7,519,819 B2 | 4/2009 | Bradley |
| 9,305,559 B2 | 4/2016 | Sharma |
| 9,747,656 B2 | 8/2017 | Stach |

(Continued)

OTHER PUBLICATIONS

Association for Automatic Identification and Mobility, Direct Part Mark (DPM) Quality Guideline, 2006.

(Continued)

*Primary Examiner* — Thien M Le
(74) *Attorney, Agent, or Firm* — Digimarc Corporation (57) ABSTRACT

In one aspect, the technology processes image data depicting a physical object to extract payload data that is encoded on the object in the form of tiled code blocks. The payload data is encoded in conjunction with an associated reference signal. To account for possible inversion of the imagery, the decoding includes determining spatial correspondence between the image data and the reference signal. A patch of the image data smaller than the block size is then selected, and correlated with a spatially-corresponding patch of the reference signal. From the correlation it may be concluded that the chosen patch exhibits inversion. In such case a subset of the image data is adjusted prior to decoding to compensate for the inversion. A great number of other features and arrangements are also detailed.

19 Claims, 7 Drawing Sheets

(56) References Cited

U.S. PATENT DOCUMENTS

| | | |
|---|---|---|
| 9,836,807 B2 | 12/2017 | Lyons |
| 10,198,648 B1 | 2/2019 | Bradley |
| 10,217,182 B1 | 2/2019 | Holub |
| 10,254,383 B2 | 4/2019 | Bradley |
| 10,515,429 B2 | 12/2019 | Rhoads |
| 10,789,438 B1 | 9/2020 | Sedighianaraki |
| 10,872,392 B2 | 12/2020 | Stach |
| 2003/0037075 A1* | 2/2003 | Hannigan ............... G09B 5/06 715/201 |
| 2003/0177359 A1* | 9/2003 | Bradley ............. H04N 1/32149 713/172 |
| 2004/0128512 A1* | 7/2004 | Sharma ............. G06Q 20/3827 713/176 |
| 2008/0037825 A1* | 2/2008 | Lofgren ................ G06F 16/58 382/100 |
| 2012/0243727 A1* | 9/2012 | Hwang ................ G06T 1/0085 382/100 |
| 2015/0016664 A1* | 1/2015 | Rodriguez ............ G06T 1/005 382/100 |
| 2016/0364623 A1* | 12/2016 | Evans ...................... G06T 3/00 |
| 2017/0193628 A1* | 7/2017 | Sharma ................ G06T 3/0056 |
| 2018/0345323 A1 | 12/2018 | Kerver |
| 2019/0171856 A1* | 6/2019 | Sharma ............ G06K 19/06103 |
| 2019/0306385 A1* | 10/2019 | Sharma ................ B42D 25/333 |
| 2020/0410312 A1 | 12/2020 | Holub |
| 2021/0299706 A1 | 9/2021 | Filler |
| 2021/0387399 A1 | 12/2021 | Filler |
| 2022/0027590 A1* | 1/2022 | Sharma ................ G06V 20/653 |
| 2022/0055071 A1* | 2/2022 | Sharma .................. B07C 5/342 |

OTHER PUBLICATIONS

ISO/IEC International Standard 18004, Information technology—Automatic identification and data capture techniques—QR Code 2005 bar code symbology specification, 2006.

ISO/IEC International Standard 18004, Information technology—Automatic identification and data capture techniques—QR Code 2005 bar code symbology specification, 2015.

* cited by examiner

2D CODE READING IN PRESENCE OF LOCAL INVERSION

RELATED APPLICATION DATA

This application claims priority to provisional application 63/156,866, filed Mar. 4, 2021, the disclosure of which is incorporated herein by reference.

TECHNICAL FIELD

The present technology concerns reading 2D codes, and more particular concerns improving the readability of such a code when a sub-part of the code is optically inverted.

INTRODUCTION 2D codes are familiar on printed objects, where they commonly take the form of patterns of black and white (or other contrasting color) cells. The white cells reflect more incident illumination than do the black cells. A camera senses the spatial differences in reflected light, and an associated image processing system extracts the encoded information from the resultant contrast pattern.

Such 2D codes (indicia) can also be formed on plastic, such as on plastic bottles and food packaging. While plastic may be printed, it is often preferable to mark the plastic otherwise, such as by molding or laser-etching. Such processes change the surface configuration of the plastic to permit camera detection.

A digital watermark is a particular type of 2D code that typically is not as conspicuous to human observers as other 2D codes (e.g., QR codes). Watermarks may be tiled, edge-to-edge, to unobtrusively mark the exteriors of plastic bottles and containers. Such wide-area coverage makes watermarks a promising technology with which to mark plastic containers, to enable automatic sorting of such containers by plastic type for recycling.

When a code is marked on a smooth plastic surface, the mirror-like reflectivity of the surface can sometimes give rise to optical inversion in the appearance of the code—flipping relatively lighter and darker areas. Particularly when such inversion affects only a sub-part of the code area, code reading is impaired.

Certain aspects of the present technology help improve code reading in such circumstances.

An exemplary method that incorporates certain aspects of the present technology starts by receiving image data depicting a physical object. Such object was earlier marked to convey a 2D machine-readable watermark indicia including both payload and reference signal components, each comprising a block of N×M elements. Spatial correspondence is determined between the image data and the indicia. That is, each of plural identified locations in the image signal is determined to spatially-correspond to a respective location in the indicia (and to a respective location in the payload component, and to a respective location in the reference signal component). A sub-part of the image data (an image patch) is next selected. This image patch is correlated with a spatially-corresponding patch of the reference signal component. Based on a result of the correlation, the image patch is determined to exhibit inversion. A corresponding subset of the image data is then adjusted to compensate for such inversion. The block of image data, after such adjustment, is then submitted to a watermark decoder for extraction of payload data.

The foregoing and additional features and advantages of the present technology will be more readily apparent from the following detailed description, which proceeds with reference to the accompanying drawings.

DETAILED DESCRIPTION

Figure 1:
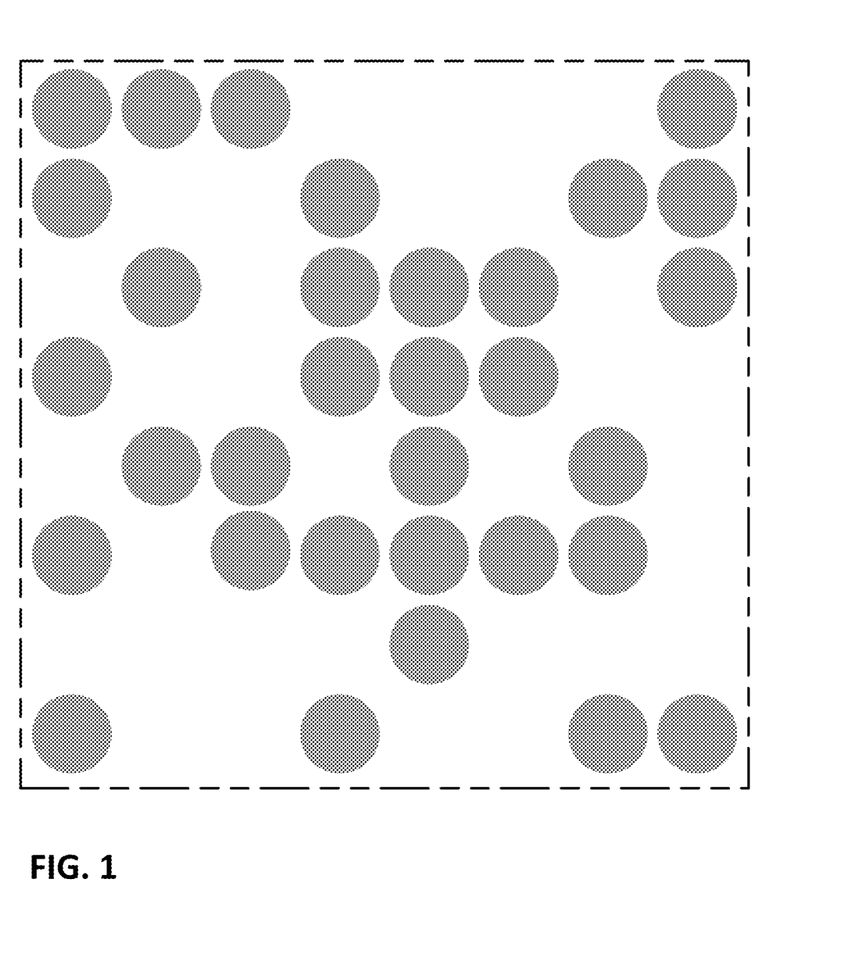
FIG. 1 shows an illustrative 2D code, which may be marked on plastic.

FIG. 1 illustrates an excerpt of a 2D code that may be applied to plastic. This code is organized as rows and columns of cells—some of which are marked (shown in grey), and some of which are left undisturbed (shown in white).

There are many forms of plastic marking. In one, each marked cell has a bump rising from the plastic surface. In another, a mark is formed as a pit into the surface. In still others a marked cell may be texturized, in whole or in part. Generally, the marked cells are different from the unmarked cells due to some disruption in their surfaces. That is, the marked calls are roughened relative to the smooth, unmarked cells.

Figure 2A:
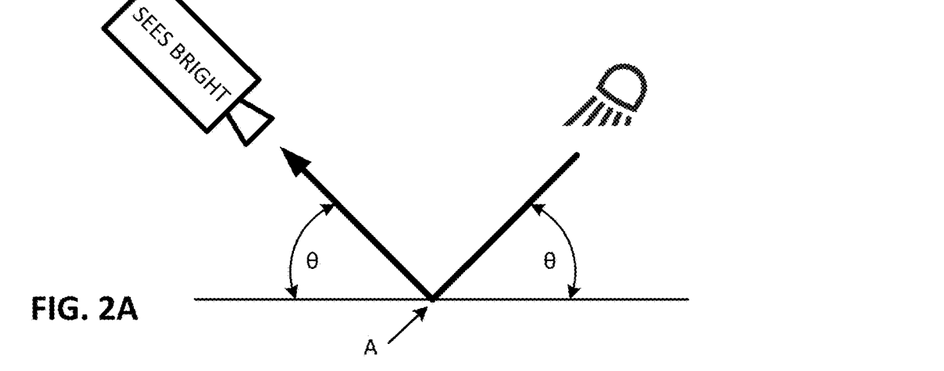
FIGS. 2A, 2B and 2C show how smooth surfaces can appear either bright or dark to a camera depending on illumination and viewing geometry, and how rougher surfaces, in contrast, have a mid-level of reflectivity in multiple directions.

The original, smooth surface of the plastic causes, essentially, specular reflection. That is, substantially all of the incident illumination is reflected from the surface, with the same exit angle as incidence angle. The surface is mirror-like. Referring to FIG. 2A, if a camera is looking at a location "A" on smooth shiny surface, from the same angle as the surface is illuminated by a light source, then all of the light incident at location "A" is reflected towards the camera. The camera senses this location "A" in the field of view as bright.

Figure 2B:
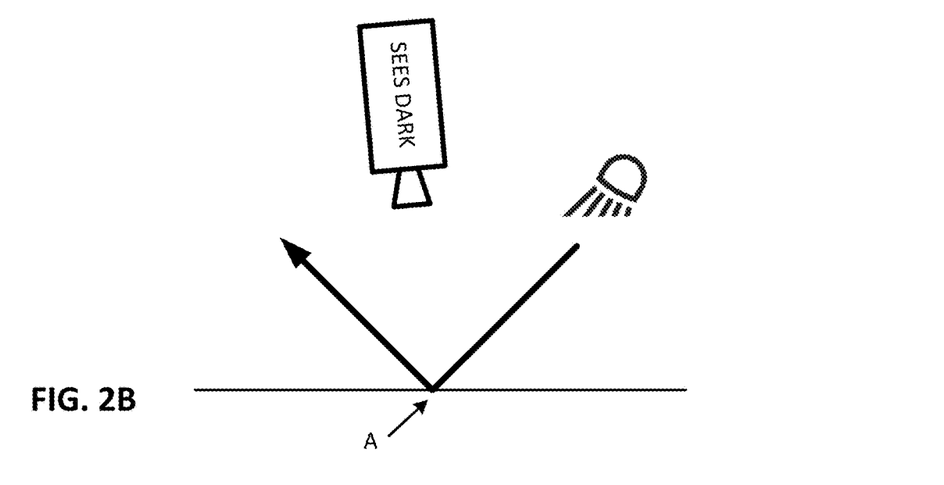

In contrast, if the camera is looking at location "A" on the smooth surface from a different angle, towards which no light is specularly reflected, then the camera senses this location as dark. This is shown in FIG. 2B.

Figure 2C:
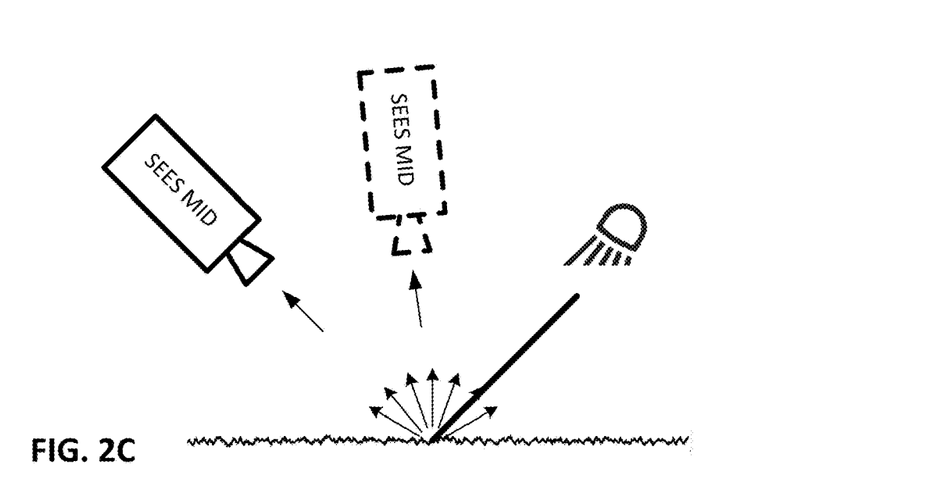

A different result occurs if the surface is roughened, as by bumps, pits or texturing. In such case some of the light incident onto a surface location is reflected in several directions. This is sometimes termed scattering, or diffuse reflection. In any event, not all of the incident light is reflected away at an exit angle equal to the incidence angle (i.e., it is not mirror-like). A camera viewing location "A," from any angle, receives an intermediate amount of light—greater than the light in the FIG. 2B situation, but less than the light in the FIG. 2A situation. This is shown in FIG. 2C.

The just-described phenomena give rise to "inversion" in the appearance of a coded mark on a smooth surface. If viewed from some angles, the cells that are unmarked and smooth appear very bright while the cells that are marked appear somewhat bright. If viewed from other angles, the cells that are unmarked and smooth appear dark while the cells that are marked still appear somewhat bright. In the former case the marked cells appear relatively dark. In the latter case the marked cells appear relatively bright.

Figure 3:
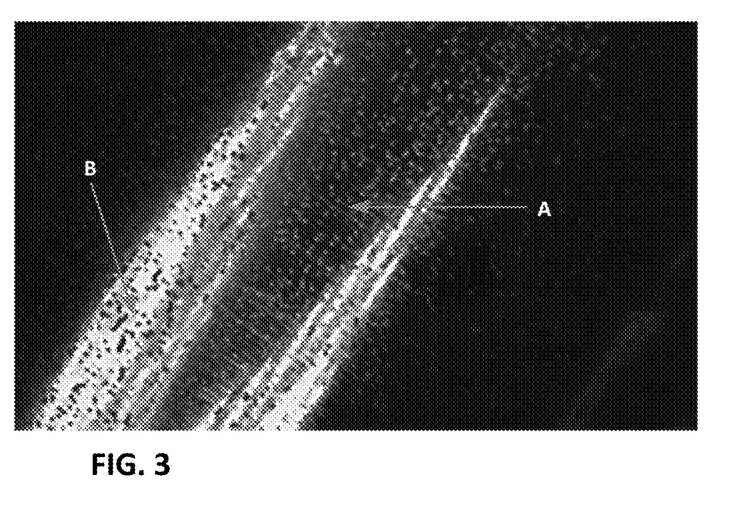
FIG. 3 is a photographic illustration of part of a plastic bottle marked with a 2D code, showing normal and inverted areas.

This is illustrated by the marked plastic bottle depicted in FIG. 3. In the region indicated by arrow "A" the marks appear relatively light. In the region indicated by arrow "B" the marks appear relatively dark. The marks have essentially the same appearance in both cases; it is the smooth bottle surface that flips in appearance, from bright to dark.

The usual case is that the marks appear light against a dark, smooth surface. We call this "normal," and is the case shown at "A" in FIG. 3. The opposite case, in which light is specularly-reflected from the smooth surface, making it appear bright and making the marks appear relatively dark, we call "inverted." This is the case shown at "B" in FIG. 3.

Whether a 2D code pattern appears in normal or inverted form makes all the difference to its decoding. If the pattern is thought to be in its normal form, but is actually inverted, then elements interpreted as a binary "1" (e.g., in the accumulation of "chips" prior to Viterbi decoding) actually indicate a binary "0", and vice versa.

One way to avoid such error, noted in our patent publications 20190306385 and WO2020186234, is to first attempt geometrical synchronization assuming that an image block is presented in the normal state. If synchronization is achieved, the block is processed normally for decoding. If the first attempt at synchronization fails, then the image block is inverted and synchronization is attempted on the inverted block. (Actually, only {x,y} translation synchronization is repeated; scale and rotation estimation results from the former analysis are re-used.) If synchronization is achieved with the inverted block, then an inverted image block is used in further processing. If neither case achieves synchronization, the attempt at decoding is abandoned. (Before efforts are abandoned, some embodiments further check to see if sync can be achieved with a mirror-reversed version of the image block, and failing that then a mirror-reversed and inverted version.)

A problem with such approach, however, is that image blocks may be partially inverted. Often an image block will include one or more excerpts that appear normal, and one or more excerpts that appear inverted, with a normal/inverted boundary crossing the image block.

In accordance with one aspect of the technology, depiction of a code block imaged from a plastic surface is processed in sub-parts, or patches. For each patch, a probabilistic assessment is made as to whether the code block fragment depicted in that patch appears in normal or inverted form. If inverted, the image patch is inverted again, restoring it to normal. After patches spanning the entirety of the code block have been processed in such manner, the processed code block is decoded.

One form of patch assessment starts by median filtering. This operation produces an output patch in which each input element (e.g., pixel or waxel) is replaced by the median value of a group of neighboring elements (e.g., 3×3, or 7×7) having the input element at its center. This median-filtered patch is then subtracted from the original patch, leaving an array of difference values. These values are averaged. If the average is positive, this means that the "salt and pepper" noise in the patch primarily has the form of occasional bright elements among a field of generally dark other elements. This is the normal case, with marked cells appearing brighter than the surrounding smooth surface of the plastic (e.g., "A" in FIG. 3). On the other hand, if the average is negative, this means that the noise in the patch primarily has the form of occasional dark elements set against a generally lighter background (e.g., "B" in FIG. 3). This is the inverted case. Thus, by judging whether local extrema in the input patch are, on average, lighter or darker than surrounding elements, a simple classification is effected indicating whether the patch is likely normal or inverted.

In alternative arrangements, forms of filtering other than median filtering can be used. These include averaging and Gaussian blurring. In still other arrangements, rather than averaging the array of difference values, its median can be taken. Again, if this value is positive, the patch is likely normal, and vice versa. Relatedly, the difference array can be examined to determine whether most of its values are positive or negative. In the former case a normal patch is indicated; in the latter case an inverted patch is indicated.

Some 2D codes, such as the digital watermark codes detailed in the below-cited patent documents, include two components: a fixed reference signal component, and a variable data payload component. In codes of this type, a second, different approach to inversion can offer better performance: correlate the captured imagery with the fixed reference signal component on a patch-wise basis, to determine locations where the reference signal is present normally, and locations where the reference signal appears inverted.

An initial hurdle with this approach is knowing the geometric alignment with which the reference signal should be correlated with the captured imagery. The watermark includes a reference signal for the purpose of indicating geometric alignment—providing a known constellation of peaks in the spatial frequency domain from which the scale, rotation and translation of such signal within the captured imagery can be discerned. But the reference signal was designed for use with print watermarking, in which inversion does not occur. The reference signal was not designed for the case where one or more sub-parts of the watermark code are expressed in normal form, and one or more sub-parts are expressed in inverted form.

Figure 4A:
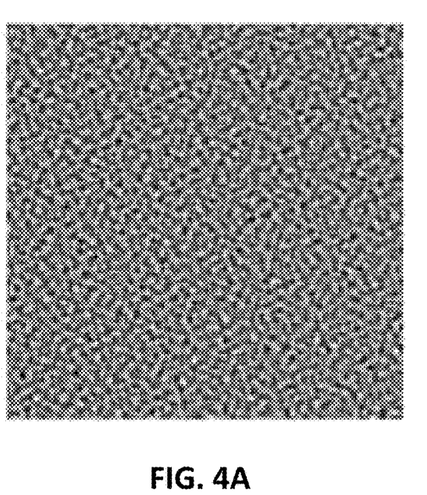
FIGS. 4A and 4B show a reference signal component of a watermark code, in both its spatial domain and spatial frequency domain representations.
Figure 4B:
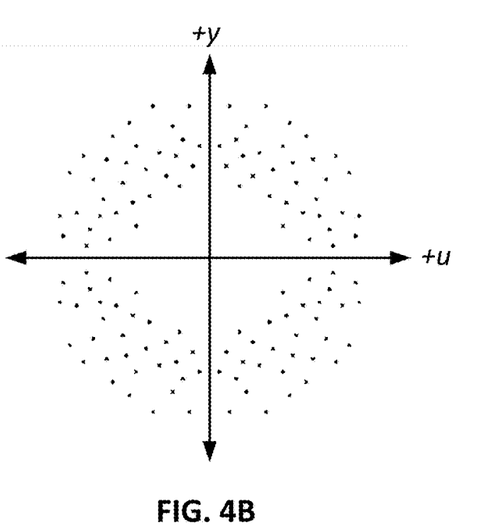

(A pixel, or spatial, domain representation of an illustrative reference signal is shown in FIG. 4A. Its spatial frequency domain transform into the {u,v} plane, showing the constellation of peaks by which geometric synchronization is established, is shown in FIG. 4B.)

By modeling, applicant investigated what happens to the spatial frequency domain reference signal when just a sub-part of a signal block is inverted. A similar analysis was conducted mathematically, as detailed in the Appendix to application 63/156,866 (which forms part of this specification).

Figure 5:
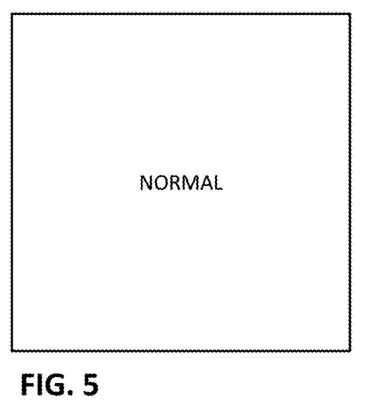
FIGS. 5 and 5A show that a reference signal depicted in its normal form has isolated peaks in its spatial frequency domain representation.
Figure 5A:
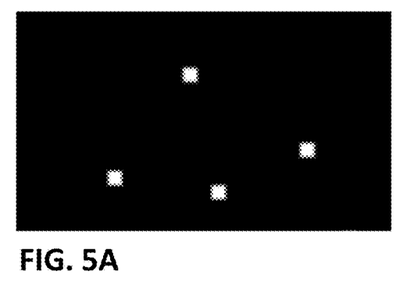

FIG. 5 shows the usual case (e.g., in print), in which a pixel domain reference signal block is depicted in its normal form, with no inversion. FIG. 5A is an excerpt of a corresponding {u,v} spatial frequency domain plot showing four of the spatial frequency domain peaks.

Figure 6:
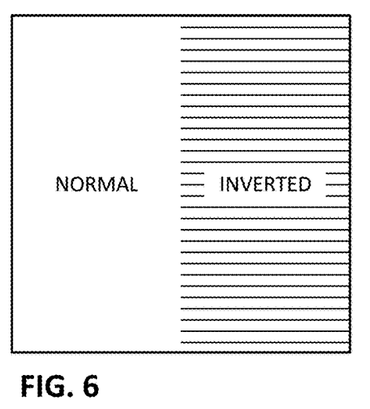
FIGS. 6 and 6A show that when a reference signal block is depicted with one half of its area normal and the other half inverted, the peaks in the spatial frequency domain representation blur in one dimension.
Figure 6A:
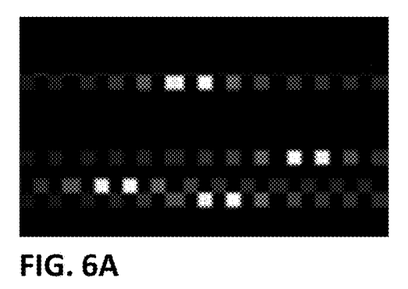

FIG. 6 shows a case in which a left side of the pixel domain reference signal block is depicted in its normal form, and the right side is depicted in inverted form. FIG. 6A shows the effect on the four spatial domain peaks depicted in FIG. 5, as modeled in MatLab. As can be seen, the peaks are echoed at diminishing amplitudes at a series of spatial frequencies uniformly spaced from the original peak location in the +u and −u directions. There are minima of signal energy at the original peak locations.

Figure 7:
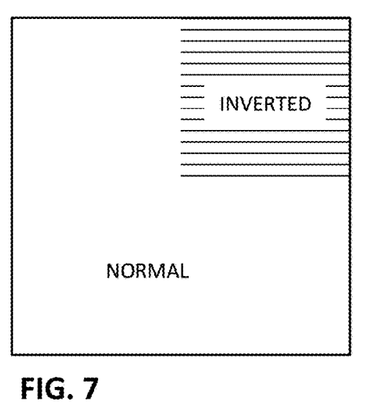
FIGS. 7 and 7A show that when a reference signal block is depicted with three quadrants of its area normal, and a single quadrant inverted, the speaks in the spatial frequency domain representation blur in two dimensions.
Figure 7A:
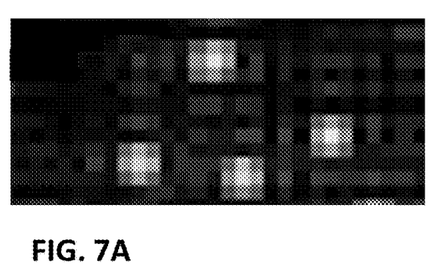

FIG. 7 shows a case in which three quadrants of the pixel domain reference signal block are depicted in their normal form, and the upper right quadrant is depicted in inverted form. FIG. 7A shows the effect on the four spatial domain peaks depicted in FIG. 5. As can be seen, the peaks are echoed at diminishing amplitudes at a series of frequencies uniformly spaced from the original peak location in the +u and −u directions, and also in the +v and −v directions. Energy is also present at the original peak locations.

As these examples show, partial inversions of the reference signal block serve to blur the original constellation of reference signal peaks. This can be intuited in hindsight mathematically.

In particular, consider a spatial array K, coextensive with the 2D reference signal, that indicates, for each element in the reference signal, whether the signal is in normal form or not. Normal elements are indicated by a "1;" the inverted elements are indicated by a "0." Such function K may then be regarded as a spatial domain kernel that defines mixing between the normal and inverted reference signals X and −X. That is, local inversion can be modeled as a sum of two spatial domain signals:

$$Y = K*X + (1-K)*(1-X)$$

This kernel is typically of low spatial frequency, e.g., changing only once or a few times across the signal block. Thus, the frequency spreading effect that this mixing kernel has on the reference signal frequency peaks is small.

Despite the blurring of the spatial frequency peaks shown in FIGS. 6A and 7A, applicant has found that synchronization approaches used in print applications to determine pose of the watermark signal in captured imagery (as detailed in the below-identified references) are adequate—to first order approximations—to permit use of correlation to determine which patches are normal and which patches are inverted. (To achieve still greater reliability, some iterative adjustment of the pose can be conducted.) The following discussion elaborates.

An illustrative embodiment begins by a camera capturing a frame of grey-scale imagery depicting a plastic item marked with a 2D watermark code. The image is desirably high-pass filtered so that the fine detail of the code is maintained, while the low frequency detail of the depicted item shape is relatively attenuated. Oct-axis filtering can be used, as detailed below. After oct-axis filtering, each pixel in the captured image frame is represented by a reduced bit value, such two bits or four bits, instead of eight or twelve.

A few to a few hundred candidate pixel blocks (possibly overlapping) are then selected from the filtered image frame in an attempt to identify possibly multiple plastic items in the camera field of view. Each block can have dimensions of the originally-encoded watermark block, e.g., 64×64, 128×128, 256×256, etc. We focus on the processing applied to a single candidate block, which is assumed to be 128×128 in size.

A fast Fourier transform is applied to the candidate pixel block, resulting in a corresponding 128×128 representation of the image block in the {u,v} spatial frequency domain. Due to the oct-axis filtering, the signal energy is dominated by the peaks of the reference signal (e.g., as shown in FIG. 4B). A log polar mapping is applied to this {u, v} plot, resulting in a Cartesian representation in which one axis indicates scale and the other axis indicates rotation. (This is sometimes termed a Fourier Mellin domain representation.)

A correlation between the captured image block and the known reference signal then follows, in the Fourier Mellin domain. That is, the constellation of peaks of the known reference signal in the {u,v} plane (FIG. 4B) is remapped to a log polar representation, and this 2D Fourier Mellin representation is correlated with the 2D Fourier Mellin representation of the captured image block. At a high level, the correlation process slides the reference signal pattern of peaks over the Fourier Mellin representation of the captured image block and measures the correlation at an array of discrete positions. Each such position has a corresponding scale and rotation parameter associated with it. Ideally, there is a position that clearly has the highest correlation relative to all of the others. In practice, there may be several candidates with a promising measure of correlation. These candidates may be subjected to one or more additional correlation stages to select the one that provides the best match.

There are a variety of ways to implement the correlation process. Any number of generalized matching filters may be implemented for this purpose. One such filter performs an FFT on the two Fourier Mellin representations, and multiplies the resulting arrays together to yield a multiplied FFT. Finally, it performs an inverse FFT on the multiplied FFT to return the data into its original log-polar domain. The position or positions within this resulting array having the highest magnitude represent the scale and rotation parameters yielding the highest correlations.

Once scale and rotation parameters characterizing depiction of the reference signal within the captured image block are determined, consideration then turns to determining the {x,y} offset, or translation, with which the reference signal appears in the capture image block.

This {x,y} translation estimation stage of operation can start by applying the determined scale and rotation parameters to the oct-axis-filtered pixel domain image block, to transform that block into a scale/rotation pose matching that of the reference signal. Next, the rescaled/rotated image block is correlated with the pixel domain reference signal (e.g., FIG. 4A). Again, a generalized matching filter approach can be used. This process provides translation parameters, namely offsets in the x and y directions, that cause the image block to best-match the reference signal. As referenced earlier, some detector implementations may perform this process twice—once with one of the two signals inverted, if synchronization is not achieved in the normal state.

The foregoing is an abbreviated version of one of several alternative processes that can be used to determine scale, rotation and translation of the watermark reference signal component within a pixel image block, i.e., determining spatial correspondence between the pixel image block and the watermark code. More detailed explanations, as well as other approaches (e.g., a direct least squares method for determining scale and rotation, and a phase deviation approach for determining {x,y} translation), are detailed in the documents cited below.

The scale, rotation and translation information (pose information) establishes a spatial relationship between waxel locations in the 128×128 watermark code signal block, and corresponding locations within the filtered image signal block. That is, one of the two signal blocks can be scaled, rotated and shifted so that each waxel location in the watermark code is spatially-aligned with a corresponding location in the imagery. Since each waxel in the watermark code is composed of a reference signal component and a payload signal component, it is likewise that case that each element location in the reference signal spatially-corresponds with a respective location in the imagery. (And similarly with each element in the payload signal.)

Next, the original image data is geometrically transformed in accordance with the just-determined pose information, to spatially-correspond with the watermark signal, and is resampled to determine image signal values at an array of 128×128 locations corresponding to the locations of the 128×128 waxels. Since each waxel location typically falls between four pixel locations sampled by the camera sensor, it is usually necessary to apply bilinear interpolation to obtain an estimate of the image signal at the desired location, based on the values of the nearest four image pixels. Oct-axis filtering is again applied. This yields a waxel-registered array of filtered image data This waxel-registered array of filtered image data (or "waxel-registered image data" for short) is next divided into two or more sub-parts. In an illustrative implementation, these parts may be 64×64 pixel quadrants of the 128×128 block, although other division criteria can naturally be used.

For each sub-part of the waxel-registered image data, a correlation operation is performed with a spatially-corresponding sub-part of the watermark reference signal. There are various techniques that can be used. The illustrative implementation employs a form of Pearson correlation, which is simply the sum, over all elements in the sub-part, of the product of the difference between the waxel-registered image data sub-part element value and the average of all such waxel-registered image data element values, and the difference between the corresponding reference signal element value and the average of all such reference signal element values. That is:

$$r = \sum_{sub-part} (x_i - \bar{x})(y_i - \bar{y})$$

where y is the value of the filtered image signal, and x is the value of the spatially-corresponding reference signal.

In a particular embodiment, the waxel-registered image data has a zero mean (i.e., the oct-axis filtering yields output values of −8, −6, −4, −2, 0, 2, 4, 6, or 8, with a zero mean). And the reference signal component may also be expressed as a zero mean signal, ranging between −1 and 1. In such case the correlation can be computed as a dot product between the waxel-registered image data sub-part values and the corresponding reference signal sub-part values.

The correlation value r indicates whether the waxel-registered image data sub-part is primarily normal in its presentation, or inverted. More particularly, if the value r is positive, the sub-part is primarily normal. If the value r is negative, the sub-part is primarily inverted. A flag for the sub-part is set accordingly.

This operation is repeated for each of the waxel-registered image data sub-parts. Each of the sub-parts is thus flagged as either normal or inverted. Decoding of the payload then proceeds on the basis of these flags.

In one particular embodiment, the waxel-registered image data within sub-part(s) that are flagged as inverted are further-inverted (re-inverted), restoring them to normal presentation. Such sub-parts are then assembled with normal sub-part(s) of the waxel-registered image data to compile an adjusted 128×128 array of waxel-registered image data. This adjusted array of image data is then submitted for decoding.

How a sub-part of waxel-registered image data is inverted depends on how such data is expressed after oct-axis filtering. As detailed in the below-cited documents, oct-axis filtering can produce different ranges of output values, depending on form. In the form of oct-axis referenced above, the filtering transforms the input image values into output values in the set {−8, −6, −4, −2, 0, 2, 4, 6, 8}. Re-inversion of a waxel-registered image data sub-part of this form involves simply flipping the sign. 8 becomes −8, etc. Another form, termed oct-axis-3, produces integers in the set {−1, 0, −1}. Inversion of such a sub-part again simply involves flipping the sign. Still another form, termed oct-axis-9, produces output values in the range 0-8. Inversion of this form involves replacing the value 8 with 0, replacing the value 7 with 1, and so forth, ending with replacing the value 0 with 8. More generally, inversion typically involves replacing the largest element value with the smallest, the next-largest with the next-smallest, and so forth. (Such flipping of the image values around a central value can be applied even if oct-axis filtering is not used.)

After the waxel-registered image data has been adjusted to compensate for the inverted sub-parts, it is submitted to a watermark decoder, which operates in the usual fashion as detailed in the prior art references below (e.g., demodulating by XORing, accumulating resulting data into estimates of the signature bit string, and then Viterbi decoding of the signature bit string).

The above-detailed determination of which image sub-parts are normal and which are inverted provides good results. But better results can be achieved with a bit more work.

In particular, due to the spatial frequency domain-blurring of the reference signal peaks illustrated by FIGS. 6A and 7A, there is a degree of uncertainty in the precise spatial correspondence between the imagery and the watermark code. To address this uncertainty, applicant usually perturbs the spatial alignment slightly in one or more different directions. For each of several different alignments the correlation is repeated. Whichever correlation results in a value r with the highest absolute value is taken as indicating whether the sub-part is normal or inverted.

Figure 8:
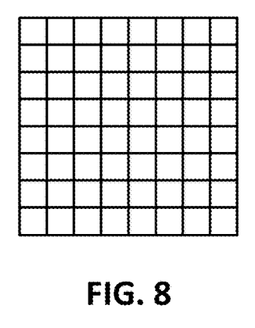
FIGS. 8, 8A and 8B show how spatial alignment between an image block sub-part, and a corresponding sub-part of a watermark reference signal, can be perturbed in a vertical dimension.
Figure 8A:
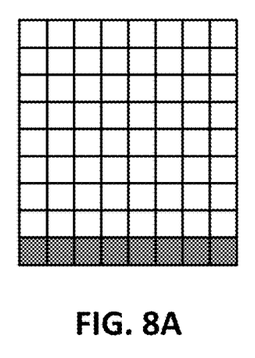
Figure 8B:
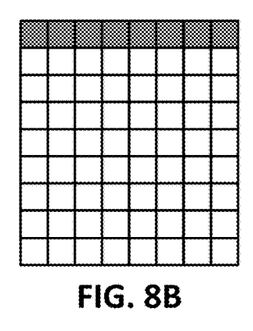

Consider FIGS. 8, 8A and 8B. FIG. 8 shows a waxel-registered image data sub-part, shown in white, spatially-aligned with a corresponding excerpt of the reference signal, shown in grey. (This example depicts an 8×8 pixel sub-part instead of a 64×64 pixel sub-part for clarity of illustration; details of the image data and reference signal are omitted. In the aligned state the two overlie, so only the former is visible.) FIG. 8A shows the waxel-registered image data sub-part position (alignment) perturbed by one pixel to the north. FIG. 8B shows the sub-part alignment perturbed by one pixel to the south. Correlation between the waxel-registered image data sub-part and the corresponding elements of the reference signal is computed at all three alignments, and the correlation result r with the largest absolute value is used to indicate whether the image inversion flag should be set for that sub-part.

Figure 9:
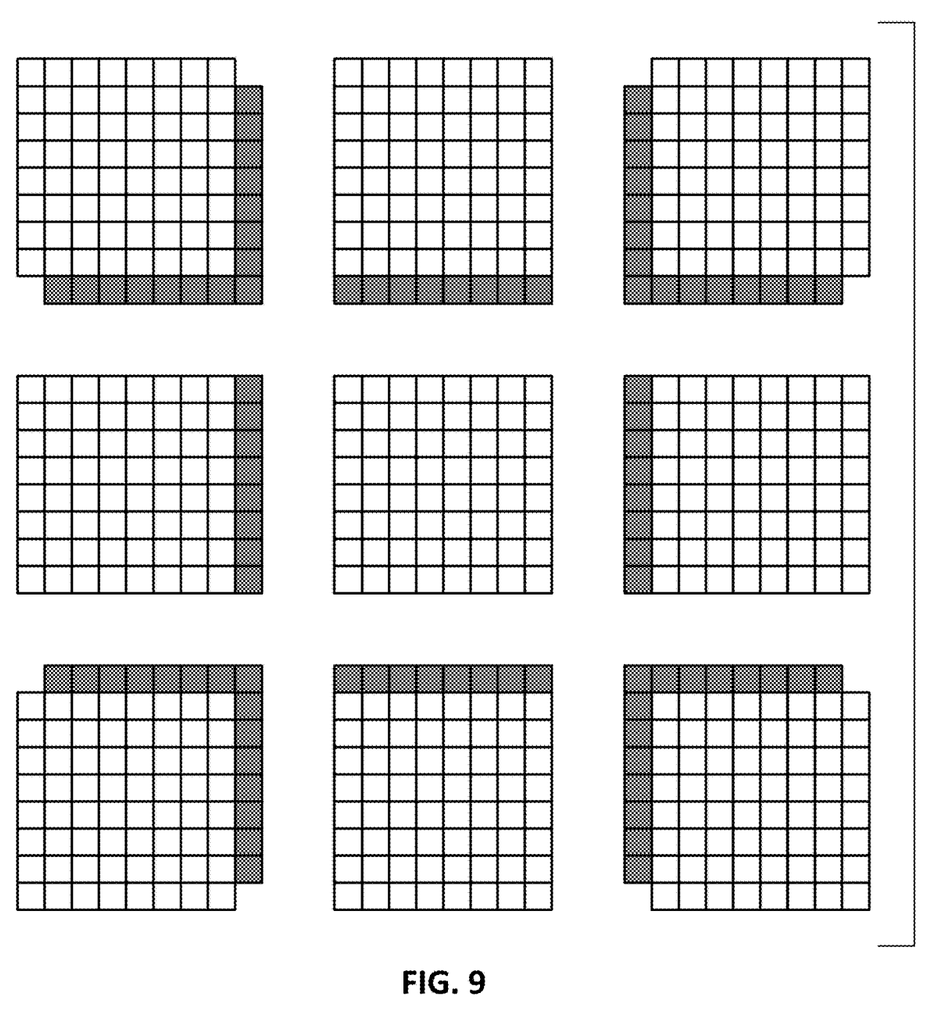
FIG. 9 shows how spatial alignment between an image block sub-part, and a corresponding sub-part of a watermark reference signal, can be perturbed to nine states (including an original alignment).

While three alignments are shown in FIGS. 8, 8A, and 8B, a larger or smaller number of alignments can be used. FIG. 9 shows a set of nine alignments. As before, correlation is determined at each alignment. The alignment yielding the strongest correlation r is taken to indicate the state of the filtered image data. If that r is positive, the waxel-registered image data sub-part is depicted in the normal state; if negative, the sub-part is depicted in the inverted state. The image sub-parts are flagged accordingly, for different treatment (e.g., re-inverting the inverted sub-parts).

Figure 10A:
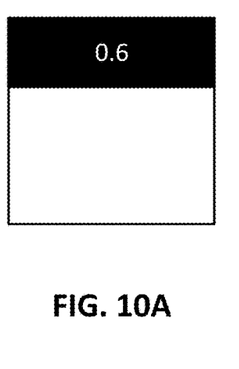
FIGS. 10A-10E show that overlapping sub-parts of an image block can be assessed for possible inversion, and indicating correlation values associated with each sub-part.

In the example just-discussed, the waxel-registered image data is divided into four mutually-exclusive sub-parts, i.e., quadrants. However, the sub-parts do not need to be mutually-exclusive. Consider FIGS. 10A-10E. FIG. 10A shows a sub-part that constitutes a third of the area of the filtered image block. So do FIGS. 10B, 10C, 10D and 10E—five thirds in all. Correlation with a corresponding excerpt of the reference signal is computed for each of these different sub-parts, and the area is classified as likely normal or inverted (or possibly ambiguous), accordingly.

Figure 10B:
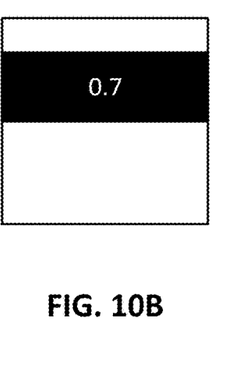
Figure 10C:
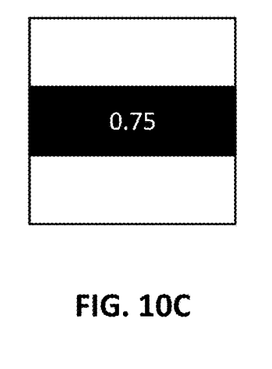

The white texts in these figures show exemplary correlation values. FIGS. 10A, 10B and 10C show relatively-strong positive correlation, i.e., above 0.3. That's a pretty good indication that the areas spanned by those sub-parts are depicted in normal form. Similarly, FIG. 10E shows a relatively-strong negative correlation, i.e., below −0.3, indicating this area is likely depicted in inverted form.

Figure 10D:
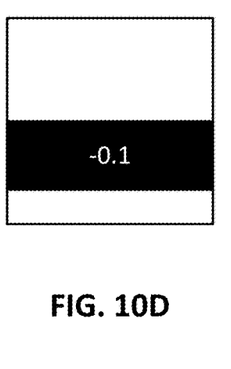
Figure 10E:
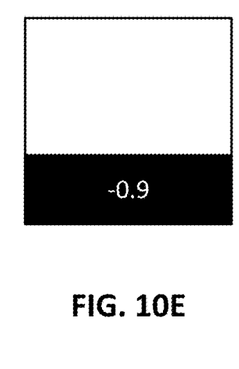

FIG. 10D gives ambiguous results. With a correlation value between −0.3 and 0.3 there seems to be a mix of pixels—some in normal state, and some in an inverted state.

Figure 11:
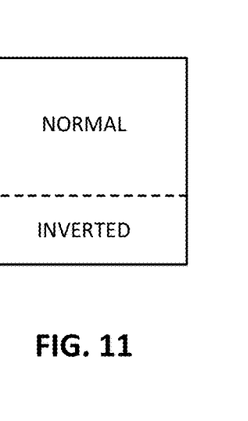
FIG. 11 shows a division of a block into likely-normal and likely-inverted areas, based on information discerned from FIGS. 10A-10E.

Based on such results, we can infer that part of the waxel-registered image data is in normal state, and part is in inverted state, with the boundary possibly passing through the region shown in black in FIG. 10D. Such a division is shown in FIG. 11. Waxel-registered image data from the lower region of this figure, under the dashed line, can be re-inverted before decoding is begun.

Figure 12:
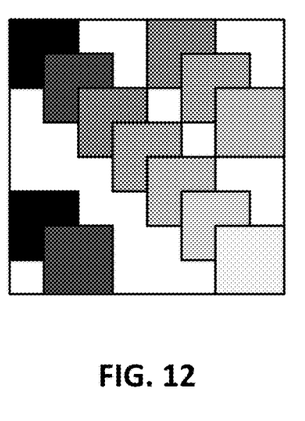
FIG. 12 shows how a multitude of overlapping sub-parts may be identified within a single block.
Figure 12A:
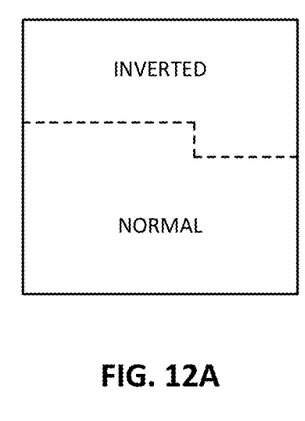
FIG. 12A shows a division of a block into non-rectangular likely-normal and likely-inverted areas, based on correlation data produced using the overlapping sub-parts of FIG. 12.

The waxel-registered image data block can be divided into a large number of sub-parts, and these can overlap. FIG. 12 shows a 128×128 block divided into sub-parts of 32×32. But each sub-part overlaps neighboring sub-parts by 16 rows and/or columns of pixels, so a great number of sub-parts are considered. (Only a few of the sub-parts are shown, for clarity of illustration.) Each sub-part, by its correlation value, may give a strong indication of either depicting the watermark code in a normal state, or of depicting the watermark code in an inverted state (or of being ambiguous). Likely-boundaries can be inferred from such results, and certain regions of the block, including non-rectangular regions (as shown in FIG. 12A), can be inverted (re-inverted) as a consequence, before being submitted for watermark decoding.

Applicant conducted a test as follows. A transparent plastic cup was texture-marked with a repetitively-tiled 2D watermark code across its outside surface, and 57 different images of the cup were captured. The different images had different areas of normal and inversion on the cup surface. From the center of each image, a 128×128 pixel block was selected and processed to determine the watermark pose. This pixel block was then re-sampled, oct-axis filtered and processed as described above (based on overlapping 32×32 sub-parts, and with application of the perturbations shown in FIG. 9). Different sub-parts of the waxel-registered image data were flagged as inverted, and processed accordingly for decoding.

Figure 13:
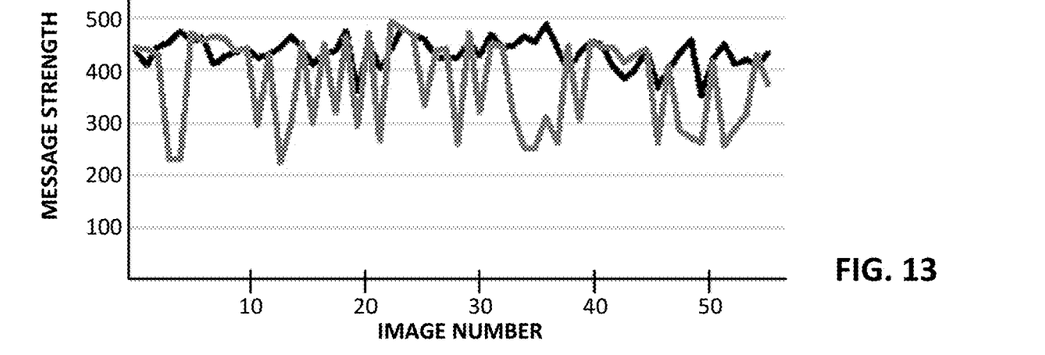
FIG. 13 shows watermark decoding performance improvements measured in one test.
Figure 14:
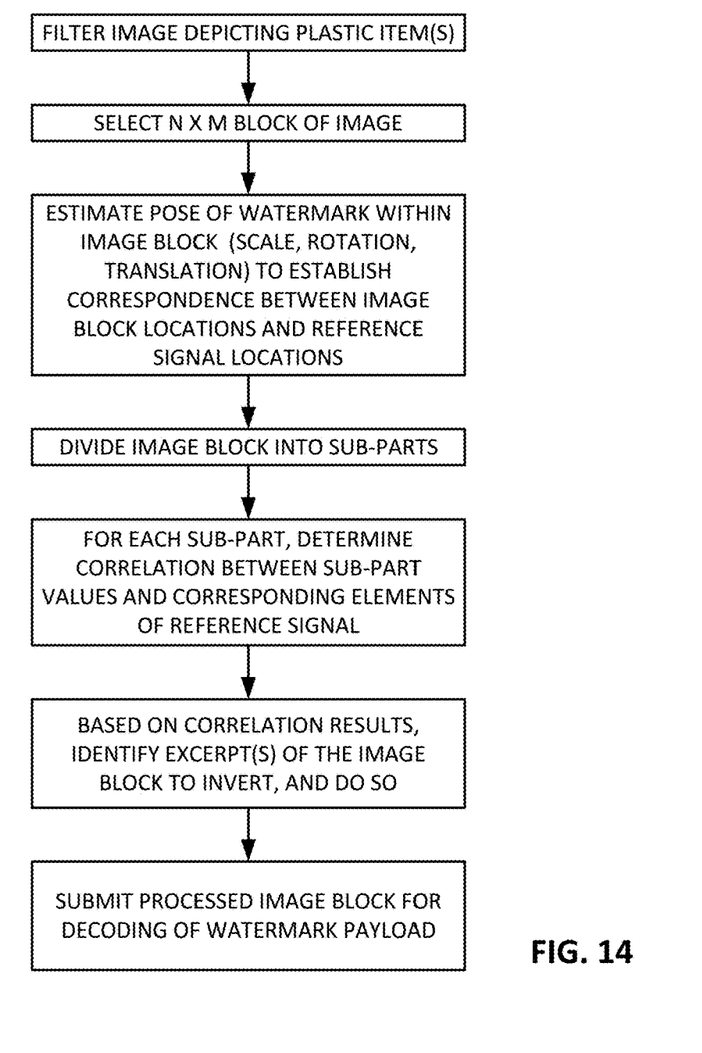
FIG. 14 is a flowchart detailing one of the algorithms described in the text.

In addition to the decoded payload, the watermark decoder used for testing also produced a payload message strength metric (per U.S. Pat. No. 10,217,182) for each tested message block. This metric indicates the likelihood that the payload can successfully be extracted in the presence of added noise (as may be introduced, e.g., by soiling on a plastic bottle imaged in a waste stream). The dark line in FIG. 13 shows message strength scores for the 57 blocks achieved using the present technology. The lighter line, in contrast, shows message strength scores achieved by inverting the entire image block, or not, in accordance with the method noted earlier (re publications 20190306385 and WO2020186234). As can be seen, the present technology effects a substantial improvement in robustness over such previous methodology. FIG. 14 is a flow chart depicting a particular one of the algorithmic processes detailed above.

A Note on Oct-Axis Filtering

In watermark detection, the underlying (host) image is often regarded as noise that should be attenuated prior to watermark decoding. This attenuation typically is performed by a high-pass filter—which is commonly non-linear. In one such arrangement, the value of each image pixel is transformed by subtracting a local average of nearby pixel values. In another such arrangement, each pixel is assigned a new value based on some function of the original pixel's value, relative to its neighbors. An exemplary embodiment considers the values of eight neighbors—the pixels to the north, northeast, east, southeast, south, southwest, west and northwest. An exemplary function sums a −1 for each neighboring pixel with a lower value, and a +1 for each neighboring pixel with a higher value, and assigns the resulting value to the central pixel. Each pixel is thus re-assigned a value between −8 and +8. (These values may all be incremented by 8 to yield non-negative values, with the results divided by two, to yield output pixel values in the range of 0-8.) Alternatively, in some embodiments only the signs of these values are considered—yielding a value of −1, 0 or 1 for every pixel location. This form can be further modified to yield a two-state output by assigning the "0" state, either randomly or alternately, to either "−1" or "1." Such technology is detailed in Digimarc's U.S. Pat. Nos. 6,580,809, 6,724,914, 6,631,198, 6,483,927, 7,688,996 and publications 20100325117, 20100165158 and 20180005343, where it is often referenced as "oct-axis" filtering. A variant filtering function, the "freckle" transform, is detailed in publication 20160189381. A further variant, "oct-vector," is detailed in pending application Ser. No. 16/994,251, filed Aug. 14, 2020 (issued as U.S. Pat. No. 11,410,263).

CONCLUDING REMARKS

Having described and illustrated various features of the technology with reference to several embodiments, it should be understood that the technology is not so limited.

For example, while described in the context of square watermark signal blocks, it is not necessary that the blocks be square. Rectangular blocks can be used. And it is not necessary that the signal elements be organized in rows and columns. For example, hexagonal and other tiling patterns can be used.

Reference was repeatedly made to pixels. It should be understood, however, that this is an expository expedient and other implementations of the technology need not be pixel-based. For example, the operations described as involving pixels can instead involve groupings that each comprise a 2×2, or larger, array of pixels, etc.

Although the described pose (alignment) perturbations are translations in x- and y-directions, other pose perturbations can be used. For example, the alignment can be changed by variations to scale or rotation. And naturally, it is the relative alignment between the image sub-part and the reference signal sub-part that matters; either may be adjusted to effect the perturbations.

While the detailed embodiments focused on 2D watermark codes, aspects of the technology are likewise applicable to codes of other types.

Watermark codes are often imperceptible to casual human inspection (steganographic), but they need not be so. The present methods can be applied regardless of the human perceptibility of the codes. Likewise, watermark codes are sometimes rendered in sparse (binary) form, and sometimes in continuous form. Again, the present methods can be applied to both.

The term "watermark" commonly denotes an indicia that escapes human attention, i.e., is steganographic. While steganographic watermarks can be advantageous, they are not essential. Watermarks forming overt, human-conspicuous patterns, can be employed in embodiments of the present technology.

For purposes of this document, a watermark is a 2D code produced through a process that represents a message of N symbols using K output symbols, where the ratio N/K is less than 0.25. (In convolutional coding terms, this is the base rate, where smaller rates indicate greater redundancy and thus greater robustness in conveying information through noisy "channels"). In preferred embodiments the ratio N/K is 0.1 or less. Due to the small base rate, a payload can be decoded from a watermark even if half of more (commonly three-quarters or more) of the code is missing.

In one particular embodiment, 47 payload bits are concatenated with 24 CRC bits, and these 71 bits ("N") are convolutionally encoded at a base rate of 1/13 to yield 924 bits ("K"). A further 100 bits of version data are appended to indicate version information, yielding the 1024 bits referenced earlier (which are then scrambled and spread to yield the 16,384 values in a 128×128 continuous tone watermark).

Some other 2D codes make use of error correction, but not to such a degree. A QR code, for example, encoded with the highest possible error correction level, can recover from only 30% loss of the code.

Preferred watermark embodiments are also characterized by a synchronization (reference) signal component that is expressed where message data is also expressed. For example, every mark in a most watermarks is typically a function of the synchronization signal. Again in contrast, synchronization in QR codes is achieved by alignment patterns placed at three corners and at certain intermediate cells. Message data is expressed at none of these locations.

Repeated reference was made to plastic items and their smooth surfaces. It will be recognized that the present technology finds use wherever smooth surfaces are marked with codes that are subject to misinterpretation when sub-parts are inverted. Glass, metal and foil are a few other examples. Similarly, while the described surfaces were marked by texturing or other 3D surface deformation, inversion can similarly occur when ink is applied to smooth surfaces, such as foil. For example, a pattern of grey ink dots printed on a foil surface may appear relatively dark or relative light, depending on whether or not the specular foil surface is reflecting light into the camera lens.

Although the detailed arrangements re-invert image sub-parts found to be inverted prior to submission to the watermark decoder, other arrangements are possible. For example, data can be sent to the decoder indicating which areas of the waxel-registered image data appear inverted. For these areas the decoder can modify its usual behavior, e.g., performing subtractions of such corresponding data, instead of additions, when accumulating estimates of signature bits for submission to Viterbi decoding.

Patent documents teaching watermark encoding and decoding arrangements include U.S. Pat. Nos. 6,590,996, 7,483,547, 9,959,587, 10,217,182, 10,242,434, 10,506,128, 20180005343, 20190332840, Ser. No. 16/849,288, filed Apr. 15, 2020 (issued as U.S. Pat. No. 11,568,165), and Ser. No. 16/994,251, filed Aug. 14, 2020 (issued as U.S. Pat. No. 11,410,263).

Watermark patterns can be tailored to have artistic, aesthetic designs, which are pleasing on injection-molded parts. Such techniques are detailed in patent publications 20190378235, 20200311505, and 20200320660.

In addition to teaching watermark encoding and decoding arrangements, the following documents also focus on 3D shaping of physical items (e.g., plastic containers) to convey watermarks: 20150016664, 20210387399, 20210390358 and Ser. No. 17/681,262, filed Feb. 25, 2022.

It will be understood that the methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The processes and system components detailed in this specification can be implemented as instructions for computing devices, including general purpose processor instructions for a variety of programmable processors, such as microprocessors and systems on a chip (e.g., the Intel Atom and i9 series, the ARM A8 and Cortex series, the Qualcomm Snapdragon, and the nVidia Tegra 4). Implementation can also employ a variety of specialized processors, such as graphics processing units (GPUs, such as are included in the nVidia Tegra series, and the Adreno 530—part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Implementation can additionally, or alternatively, employ special purpose electronic circuitry that has been custom-designed and manufactured to perform some or all of the component acts, as an application specific integrated circuit (ASIC).

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: local device, remote device, in the cloud, distributed, etc.

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the technology.

The invention claimed is:

1. A method employing image data corresponding to a physical object, said physical object having earlier been marked to convey a 2D machine-readable indicia of a first size, said earlier-marked indicia including a payload signal component and a reference signal component, the method comprising the acts:
   determining spatial correspondence between the image data and the reference signal component of the 2D machine-readable indicia;
   selecting a patch of the image data that is smaller than said first size, and correlating the patch of the image data with a spatially-corresponding patch of the reference signal component;
   concluding, from a result of said correlating, that the patch of image data exhibits inversion; and
   adjusting only a subset of the image data, less than an entirety of the image data, to compensate for said determined inversion.

2. The method of claim 1 in which said physical object was earlier-marked to convey a pattern of edge-to-edge tiled blocks, each block being an instance of said 2D machine-readable indicia of the first size.

3. The method of claim 1 that further includes applying said adjusted subset of the image data, with a non-adjusted subset of the image data, to a watermark decoder for extraction of payload data.

4. The method of claim 1 that includes filtering camera data depicting the physical object to produce the image data, the camera data comprising an array of positive values, the filtering comprising transforming said array of positive values into an array comprising both positive and negative values, wherein said adjusting comprises flipping signs of the positive and negative values in said subset of the image data.

5. The method of claim 1 that includes filtering camera data depicting the physical object to produce the image data, the camera data comprising an array of values, the filtering comprising transforming said array of values into an array including first values and second values, wherein said adjusting comprises changing the first values to the second values, and vice versa, in said subset of the image data.

6. The method of claim 1 that includes filtering camera data depicting the physical object to produce the image data, the camera data comprising an array of values, the filtering comprising transforming said array of values into an array including first values, second values and third values, wherein said adjusting comprises changing the first values to the third values, and vice versa, in said subset of the image data.

7. The method of claim 1 in which said subset of the image data and said patch of the image data are co-extensive.

8. The method of claim 1 in which said subset of the image data and said patch of the image data are not co-extensive.

9. A method employing image data corresponding to a physical object, said physical object having earlier been marked to convey a 2D machine-readable indicia of a first size, said earlier-marked indicia including a payload signal component and a reference signal component, the method comprising the acts:

determining spatial correspondence between the image data and the reference signal component of the 2D machine-readable indicia;

selecting a first patch of the image data that is smaller than the first size, and correlating said first patch of the image data with a spatially-corresponding patch of the reference signal component;

selecting a second patch of the image data that is smaller than the first size, and correlating said second patch of the image data with a spatially-corresponding patch of the reference signal component;

concluding, from results of said correlating acts, that one of said patches of the image data exhibits inversion and one of said patches of the image data does not exhibit inversion; and adjusting a subset of the image data to compensate for the one of said patches of the image data that exhibits inversion.

10. The method of claim 9 in which said physical object was earlier-marked to convey a pattern of edge-to-edge tiled blocks, each block being an instance of said 2D machine-readable indicia of the first size.

11. The method of claim 9 that further includes applying said adjusted image data to a watermark decoder for extraction of payload data.

12. The method of claim 9 in which said first and second patches of the image data have no element in common.

13. The method of claim 9 in which said first and second patches of the image data include elements in common.

14. A method employing image data corresponding to a physical object, said physical object having earlier been marked to convey a 2D machine-readable indicia of a first size, said earlier-marked indicia including a payload signal component and a reference signal component, the method comprising the acts:

(a) determining initial spatial correspondence between the image data and the reference signal component of the 2D machine-readable indicia;

(b) selecting a patch of the image data that is smaller than said first size, and correlating the selected patch of the image data with a spatially-corresponding patch of the reference signal component;

(c) perturbing initial spatial correspondence between the image data and the reference signal component, said perturbing changing locations within the reference signal component to which locations in the selected patch of the image data correspond, and performing a further correlation operation based on said perturbed spatial correspondence, yielding a further correlation value associated with said perturbed spatial correspondence;

(d) repeating act (c) one or more further times with differently-perturbed spatial correspondences, yielding one or more still further correlation values, each associated with a differently perturbed spatial correspondence;

(e) identifying one of said correlation values as having a highest absolute value, and determining from a sign of said identified correlation value whether the selected patch of the image data exhibits inversion; and (f) adjusting the image data to compensate for said determined inversion.

15. The method of claim 14 in which said physical object was earlier-marked to convey a pattern of edge-to-edge tiled blocks, each block being an instance of said 2D machine-readable indicia of the first size.

16. The method of claim 14 that further includes applying said adjusted image data to a watermark decoder for extraction of payload data.

17. The method of claim 14 in which said perturbing comprises effecting a translational shift.

18. The method of claim 14 in which said perturbing comprises changing rotation.

19. The method of claim 14 in which said perturbing comprises changing a scale relationship.

* * * * *